April 1, 1941.  C. J. WUNDERLE  2,236,556
HYDRAULIC BRAKE OR CLUTCH
Filed April 10, 1939  4 Sheets-Sheet 1

INVENTOR.
CARL J. WUNDERLE
BY
ATTORNEYS

April 1, 1941.     C. J. WUNDERLE     2,236,556
HYDRAULIC BRAKE OR CLUTCH
Filed April 10, 1939     4 Sheets-Sheet 3

INVENTOR.
CARL J. WUNDERLE
ATTORNEYS

April 1, 1941.　　　C. J. WUNDERLE　　　2,236,556
HYDRAULIC BRAKE OR CLUTCH
Filed April 10, 1939　　　4 Sheets-Sheet 4

INVENTOR.
CARL J. WUNDERLE
BY
Kwis Hudson & Kent
ATTORNEYS

Patented Apr. 1, 1941

2,236,556

UNITED STATES PATENT OFFICE 2,236,556

HYDRAULIC BRAKE OR CLUTCH

Carl J. Wunderle, Shaker Heights, Ohio, assignor of one-half to Jacob R. Snyder, Cleveland, Ohio Application April 10, 1939, Serial No. 266,968

19 Claims. (Cl. 188—90)

This invention relates to hydraulic brake and clutch devices, and as its principal object aims to provide an improved construction for devices of this character.

Another object of my invention is to provide an improved construction, for hydraulic brakes and clutches, which embodies a minimum number of parts of a form adapted to be readily constructed and assembled and which is capable of rendering prolonged efficient and reliable service without requiring adjustment or repair.

A further object of my invention is to provide an improved hydraulic brake or clutch of the self-contained rotary type having cooperating cylinder and piston members and in which the cylinder member is supported and guided in a floating or freely rotatable condition whereby friction and heat generation in the device are reduced to a minimum.

Still another object of my invention is to provide an improved hydraulic brake or clutch having cooperating cylinder and piston members and in which the cylinder member is in the form of a floating or freely rotatable ring and is supported and guided for shifting transversely of the axis of the piston from a released position substantially concentric with the piston to an operating position eccentric to the piston.

My invention may be further briefly summarized as consisting in certain novel combinations and arrangements of parts hereinafter described and particularly set out in the appended claims.

In the accompanying sheets of drawings.

More detailed reference will presently be made to the accompanying drawings in which I have shown hydraulic brake and clutch devices constructed according to my invention. Before proceeding with such more detailed description, however, it should be understood that my invention is not to be regarded as limited to the particular devices and constructions herein disclosed, but may be embodied in various other similar devices and specific forms of construction.

In Figs. 1 to 5, inclusive, I show my invention embodied in a hydraulic brake and in Figs. 10 to 14, inclusive, I show my invention embodied in a hydraulic clutch. The construction and operation of both of these devices will be described in detail hereinafter and from such detailed description it will be readily seen that similar features and principles of my invention are embodied in both devices.

My hydraulic brake, as shown in Figs. 1 to 5, inclusive, may be provided with a housing or casing 15 having therein a combined operating chamber and reservoir 16 which is partially filled with oil or other suitable hydraulic braking medium 16a. Piston and cylinder members 17 and 18 are arranged for operation in the chamber 16 and cooperate to produce a desired braking action or resistance effect, as will be presently explained.

The housing 15 may comprise a hollow drum-like member or section 19 of cylindrical or other desired form and a cover member or section 20 having fluid tight connection therewith. These housing sections 19 and 20 may be provided with aligned bearings or bushings 21 and 22 in which shaft portions 23 and 24 of the piston or piston member 17 may be journaled thus providing for rotation of the piston in the housing 15 about a fixed axis.

In the brake form or embodiment of my hydraulic device, the housing 15 is normally held stationary as by being connected with the axle housing of a vehicle or with some other relatively stationary support or part of the apparatus with which my brake is to be used. The shaft portion 24 of the piston 17 may be connected with the part or member which is to be braked or slowed and in the case of a vehicle brake, this shaft portion may be connected with, or may be an extension of, an axle or shaft which carries a wheel of the vehicle. It will be readily understood, of course, that instead of the housing 15 being held stationary and the piston 17 being rotatable with the member to be braked, the reverse arrangement could be provided, that is to say, the housing 15 could rotate by being connected with the wheel or other member to be braked and the piston 17 could be held stationary by suitably connecting the shaft portion 24 thereof with an available relatively stationary part or support.

The piston 17 may, as shown in this instance, comprise a cylindrical body 17a which is rotatable in the housing 15 and which carries a plurality of circumferentially spaced vanes 26. The body of the piston may be provided with circumferentially spaced radial slots or recesses 27 in which the vanes 26 are slidably carried. Any suitable number of vanes may be provided and, in this instance, I show the piston having four such vanes 26a, 26b, 26c and 26d. Compression springs 28 may be provided in the radial slots 27 for normally urging the vanes outwardly into engagement with the inner face or periphery of the cylinder or cylinder member 18.

Figures 1, 2, 6, 7, 8, 9:
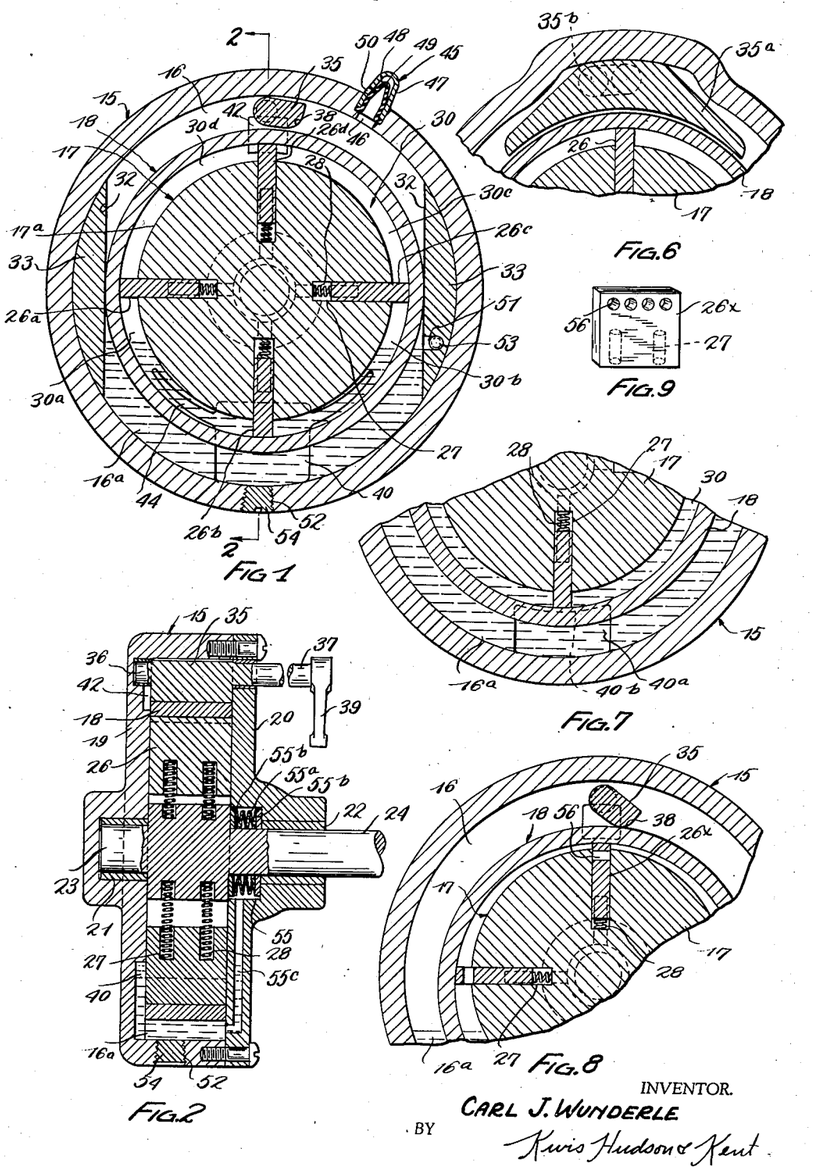
Fig. 1 is a transverse sectional view taken through a hydraulic brake constructed according to my invention.
Fig. 2 is a longitudinal or axial sectional view taken through the brake as indicated by line 2—2 of Fig. 1.
Fig. 6 is a fragmentary sectional view similar to Fig. 1 but showing a modified form of my brake in which a different actuating cam is used.
Fig. 7 is a fragmentary sectional view showing another modification of my brake in which a differently arranged fluid supply port is used.
Fig. 8 is a fragmentary sectional view showing still another modified form of my brake in which openings or fluid passages may be provided in the vanes.
Fig. 9 is a detached perspective view showing a vane of the form having openings or fluid passages therein.

The cylinder 18 may comprise a circular ring surrounding the piston 17 so as to provide therebetween a working chamber 30 which is divided into a series of pockets 30a, 30b, 30c and 30d by the vanes 26. This ring may be an open-ended or plain, that is unflanged, ring formed by a circularly extending rim of substantially rectangular cross-sectional shape. As shown in Fig. 2, the ring forming the cylinder 18, the piston body 17a and the vanes 26 are all of substantially the same axial length, that is to say, of a length such that their ends have direct substantially fluid tight sliding engagement with the opposed inner faces of the housing sections 19 and 20.

It can be best explained at this point that the cylinder or ring 18 is guided and supported in a more or less free-floating and freely rotatable condition in the housing 15 so that during the operation of the device it can either stand stationary with the housing or can rotate relatively free with the piston 17. This is an important feature or charcateristic of my hydraulic device because, as will be explained more fully hereinafter, in providing for such floating or relatively free rotation of the cylinder, I eliminate much of the frictional drag, wear and undesirable heating heretofore encountered in devices of this character.

The cylinder 18 is supported mainly by the vanes 26 of the piston 17 and, in the released condition of my brake as illustrated in Fig. 1, the pressure of the springs 28 causes the vanes to support the cylinder or ring in a position substantially concentric with the axis of rotation of the piston. When the cylinder occupies this relative position, it will be noted that the working chamber 30 is ring-shaped or circular and hence during rotation of the piston at this time, the volume of the pockets 30a, 30b, 30c and 30d will remain unchanged and no braking resistance will be developed. If braking effort or resistance is desired, the cylinder or ring 18 is shifted transversely to the axis of rotation of the piston to an eccentric operating position such as that shown in Fig. 3 of the drawings. When the parts occupy the relative positions shown in Fig. 3 it will be noted that the working chamber 30 has assumed a more or less crescent shape and that the pockets 30a, 30b, 30c and 30d will vary in volume during rotation of the piston and, as will be later explained in detail, this will produce a braking effort tending to prevent rotation of the piston.

As above mentioned, the cylinder 18 is supported and guided in a free-running or free-floating condition, but is shiftable transversely of the axis of rotation of the piston from a released concentric position to an eccentric operating position. The guiding means for the cylinder or ring 18 is formed in part by the adjacent faces of the housing sections 19 and 20 and in part by a pair of opposed guide and thrust faces 32 provided on the housing. The guide faces 32 may be arranged to contact the outer periphery of the cylinder at substantially diametrically opposed points and are of a length to maintain such contact during shifting of the cylinder from its concentric to its eccentric position. Spaced guide faces for this purpose may be provided on the housing 15 by forming or mounting therein segment-like blocks or portions 33 with their adjacent faces 32 in substantially parallel relation.

Figures 3, 4, 5:
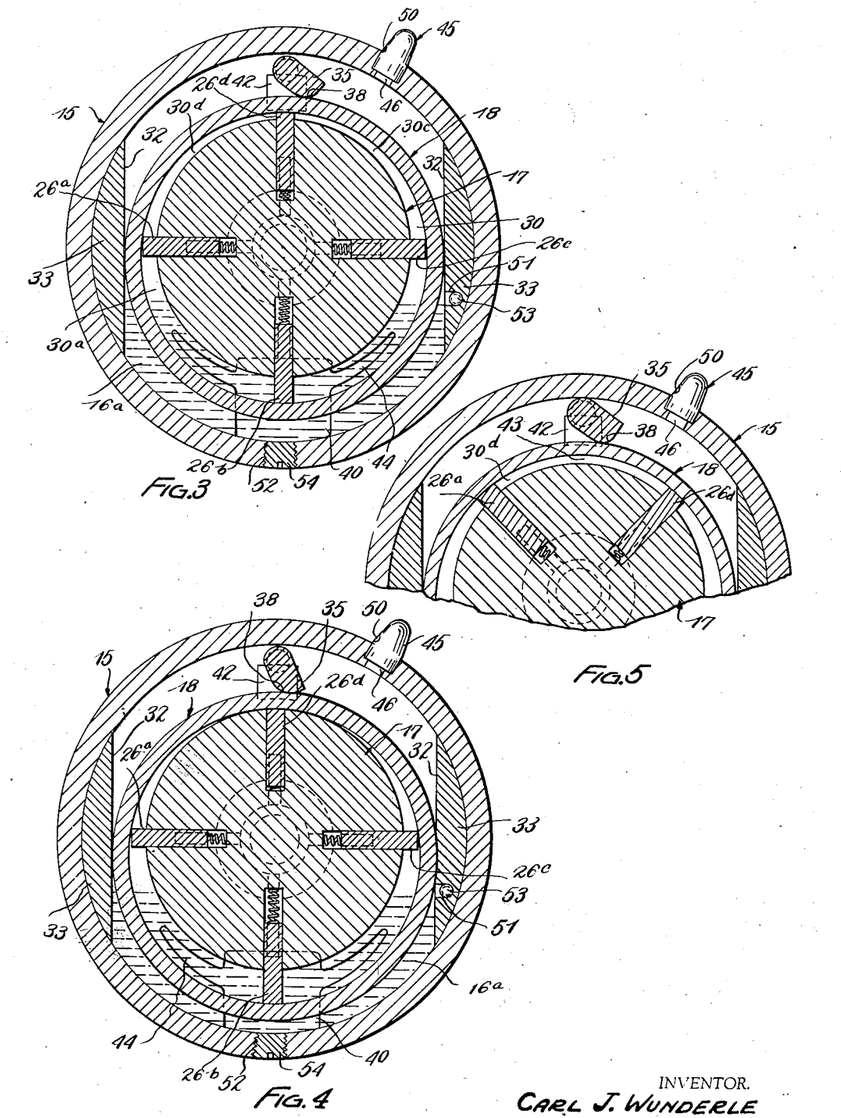
Fig. 3 is a sectional view of my brake similar to Fig. 1 but showing the brake in an applied condition or position.
Fig. 4 is another such sectional view showing the brake in a fully applied or locked condition.
Fig. 5 is a fragmentary sectional view of my brake similar to Fig. 3 but showing the piston member rotated 45° from its position in Fig. 3.

The desired transverse shifting of the cylinder 18 from its concentric position of Fig. 1 to its eccentric operating position of Fig. 3 may be effected by any suitable means such as the actuating cam 35 shown in this instance. The cam 35 may be carried by aligned shaft portions 36 and 37 which are journaled for rocking movement in the housing sections 19 and 20. This cam may be of the same axial length as the cylinder and may have a rounded contact portion 38 for engagement with the outer periphery thereof. The cam 35 and its supporting shaft sections 36 and 37 are preferably located substantially midway between the spaced guide faces 32 of the housing, that is to say, the shaft sections 36 and 37 are journaled in the housing with their axes lying substantially in a diametrical plane extending parallel with the guide faces 32 and substantially midway therebetween. In this instance I show the shaft sections 36 and 37 located in such a diametrical plane which passes through the axis of rotation of the piston 17. Oscillation or rocking movement may be imparted to the shaft section 37 and the cam 35 by any suitable means such as brake applying linkage including a lever 39 mounted on the shaft section 37.

As indicated above, the operating chamber and reservoir 16 of the housing 15 may be partially filled with a body of liquid 16a which serves as the resistance medium or braking fluid. This liquid also serves to lubricate the various parts and surfaces of my brake. For supplying such liquid from the reservoir chamber 16 to the working chamber 30 and the pockets thereof, I provide the supply port 40. This supply port may be formed in the end wall of the housing section 19 so as to extend across the end or edge of the cylinder 18 and communicate with the working chamber 30. If desired, a similar supply port can be formed in the inner face of the housing section 20 so as to provide communication between the reservoir chamber and the working chamber around both ends or edges of the cylinder. As shown in Fig. 1, the ports or port 40 is below the level of the body of liquid 16a and in this instance is shown as being located diametrically opposite the actuating cam 35 so as to provide a symmetrical arrangement and one in which a similar braking action will be obtainable for both directions of rotation of the piston 17.

From the construction of my hydraulic brake as thus far described, it will be seen that when the brake is released as shown in Fig. 1, the cylinder 18 is in a concentric position and the piston 17 can be rotated freely since the volume of the pockets 30a, 30b, 30c and 30d is not subjected to change. During this condition of operation, some of the liquid 16a may be picked up by the pockets as they travel past the supply port 40, but since the pockets do not change in volume this liquid will not be subjected to pressure and no braking resistance will be developed. During this condition of operation the cylinder 18 is in a floating or free-running condition in which it can either remain stationary with the housing 14 or can rotate freely therein with the piston 17. Whether the cylinder will remain stationary or will rotate with the piston during this condition of operation, is dependent upon frictional coefficients and various other factors, but by reason of the ability of the cylinder to rotate in this condition of the brake it will be seen that frictional resistance will be reduced to a minimum. It will also be seen that the liquid which is picked up by the pockets as they traverse the port 40 will serve to lubricate the inner surface of the cylinder and reduce friction between the same and the vanes 26. Moreover, since this liquid is not at this time subjected to pressure, little or no work will be expended thereon and there will be substantially no resultant heating of the liquid. Such rotation of the cylinder as takes place during this released condition of the brake will cause some of the liquid of the body 16a to adhere to the outer surface of the cylinder and to lubricate its contact with the guide faces 32 and the cam 35.

To avoid any tendency toward creating a pressure in the pockets during this released condition of the brakes, I may provide a port 42 for venting the upper portion of the working chamber 30 into the reservoir chamber 16 above the liquid level therein. The port 42 may be formed in the inner face of the end wall of the housing section 19 and may have such size and location that it will connect the working chamber 30 with the chamber 16 when the brake is in its released condition as shown in Fig. 1, but will be disconnected from the working chamber when the cylinder is shifted to its eccentric operating position. Thus during actual braking the port 42 is ineffective and substantially none of the liquid returns to the reservoir chamber through this port. I find that the provision of the port 42 also accomplishes a very useful function in facilitating the shifting of the cylinder member 18 to its eccentric position and in reducing or eliminating objectionable vibration. In accomplishing these results the port 42 prevents the building up of substantial pressures in the pockets during the initial shifting of the cylinder member and until this member has been shifted to an eccentric operating position and therefore less effort is required to cause such shifting of the cylinder member and the tendency to cause objectionable vibration will be substantially eliminated.

When braking effort or resistance is desired, the brake is applied by actuating the cam 35 to shift the cylinder 18 to its eccentric operating position shown in Fig. 3. When the cylinder is in the relative position shown in this view, clockwise rotation of the piston 17 will cause the pockets 30a, 30b, 30c and 30d to traverse the port 40 in succession and the liquid which will be picked up by each pocket at this point will be carried thereby to the position of the pocket 30d, this being the position at which the liquid of this pocket is about to be subjected to pressure. In the condition shown in Fig. 3, the uppermost vane 26d is about to travel past the point or section 43 of minimum restriction of the working chamber 30. As soon as this vane passes this point of minimum restriction (see Fig. 5) the liquid in the chamber 30d is subjected to pressure by the following vane 26a and is thereby forced through the restriction into the portion of the pocket immediately following the vane 26d and which has already passed the restriction. The building up of pressure in the pockets in succession as they leave the position of the pocket 30d in Fig. 3 and the forcing of the fluid through the restriction produces the desired braking effort or resistance. As the pockets travel from the section 43 of minimum restriction toward the port 40 they enlarge and a partial vacuum is created therein which assists materially in causing liquid to enter each pocket as soon as it reaches the port 40.

It will be understood, of course, that when the piston 17 is rotated in a reverse direction, that is to say in a counterclockwise direction as seen in Fig. 3, a similar braking effort or resistance will be developed.

It may be desirable to regulate or vary the amount of liquid which is picked up by the pockets as they pass the supply port 40. This may be readily accomplished by providing this port with tapered arcuate extension recesses 44 which extend part way along the path of travel of the pockets as they leave the supply port. The extension recesses 44 thus connect the pockets with the port 40 after they have passed the edges of the latter and permit some of the liquid which has been picked up by the pocket to flow back to the supply port and reservoir. The amount of liquid to be thus returned to the reservoir from the pockets can be varied by changing or varying the cross-sectional area and length of the extension recesses 44. Thus by varying these factors, as it may be necessary or desirable to do with different sizes and types of brakes as well as with different conditions of brake service, the desired operating characteristics can be obtained. It will also be understood that the extension recesses 44 may be omitted entirely if this is found desirable.

I may wish to vent the interior of the housing 15 to atmosphere to prevent pressure from building up in the chamber 16. This may be accomplished by providing the housing with a suitable vent fitting or device 45. This venting device may be mounted in an opening 46 which extends through the wall of the housing adjacent the top thereof. In this instance the venting device comprises a cup-shaped cover member 47 formed of sheet metal or other suitable material and an inner member 48 formed of rubber or other flexible material. The member 47 may be pressed into a counterbored portion of the opening 46 so as to inclose the flexible inner member 48 and exert a clamping action on a portion thereof. The inner member may be provided at its tip with a restricted vent opening 49 which, with an opening 50 of the outer member 47, provide a circuitous or baffled vent passage which connects the chamber 16 with atmosphere but prevents the entry of dust or other foreign matter through this passage.

The housing 15 may also be provided with filling and drain openings 51 and 52 through which the liquid 42 may be introduced into the housing or drained therefrom. The filling opening 51 is preferably located at a point on the housing to correspond with the maximum level or height to which the housing is to be filled with the liquid 16a. These filling and drain openings may be closed, respectively, by removable closure members such as the screw plugs 53 and 54.

To prevent the escape of liquid from the housing 15 through the bearing 22 and around the shaft 24, I may provide the housing section 20 with a recess 55 in which a shaft packing of any suitable form may be used. The packing 55a shown in this instance is a flexible bellows-like member disposed around the shaft and having end rings 55b which bear, respectively, against the body of the piston 17 and the bottom of the recess 55. To prevent an accumulation of liquid or pressure in the recess 55, I may provide a return or drain passage 55c which connects the recess with the lower portion of the chamber 16 of the housing.

It may be desirable to prevent the liquid from being supplied to the working chamber 30 and the pockets thereof when my brake is in its released condition to thereby avoid unnecessary churning or agitation of the liquid which might otherwise result in the generation of heat. To this end I may construct the supply port of reduced size so that communication between the reservoir and working chamber will be cut off when the cylinder 18 is in its concentric position. A port 40a of this modified form is shown in Fig. 7 of the drawings in which it will be seen that the upper edge 40b of the port is of arcuate shape and is located, with respect to the axis of rotation of the piston 17, a slightly greater radial distance than the inner face of the cylinder 18 when the latter is in its concentric position. Although the communication between the reservoir and the working chamber 30 is cut off when the brake is in its released position, as shown in Fig. 7, it will be understood that as soon as the cylinder 18 is shifted downwardly by the actuating cam to an eccentric operating position, the port 40a will connect the reservoir with the operating chamber so that liquid will be picked up by the pockets during rotation of the piston in either direction.

Instead of actuating the cylinder 18 by means of the cam 35 which has a line or point contact with the outer face of the cylinder, I may employ an actuating cam of shoe-like form such as the cam 35a shown in Fig. 6. This cam may be carried by an actuating shaft 35b which is adapted to be rocked or oscillated for engaging the cam with the cylinder and causing the above mentioned transverse shifting thereof. The advantage of using a cam of the shape of the cam 35a is that deflection or springing of the cylinder 18 is less likely to occur because the area of contact between the cam and cylinder is much more extensive than when the cam merely has line or point contact therewith.

It may be desirable to apply my hydraulic brake to all four wheels of an automobile or other vehicle and when so used it may be desirable that the brakes of the front wheels be less effective than the brakes of the rear wheels. An important aspect of my invention is the feature by which such a less effective braking action for the front wheels can be readily obtained. This feature of construction is illustrated in Fig. 8 and consists in providing a hole 56, or a series of such holes, in one or more of the vanes 26x of the brakes which are to be used on the front wheels. As shown in Figs. 8 and 9, the holes 56 are located adjacent the outer end or top of the vane or vanes and provide fluid passages through the vanes which connect the pocket on one side of the vane with the adjacent pocket on the other side. The passages formed by the holes 56 permit more or less of the liquid to pass directly from one pocket to the other and hence the escape of liquid from the compression pocket in this way reduces the effectiveness of the brake in which these holes have been incorporated. It will be noted, however, that if maximum or strong braking effort should be required and the cylinder member 18 is shifted to or adjacent its position of maximum eccentricity, the holes will recede into the body of the piston member as the vanes approach the point of tangency between the piston and cylinder members. Thus in this extreme braking position, the holes 56 will be more or less covered and they will then produce little or no reduction in the braking effort developed by the brake.

At times in the operation of a vehicle or other apparatus equipped with my hydraulic brake, it may be desirable to apply the brake to its maximum position and thereby hold or lock the wheel or rotatable part against turning. In the case of a vehicle this may be necessary when it is desirable to stop or park the vehicle on a hill. In Fig. 4 of the drawings I show my brake applied to its maximum or locked position in which the cylinder 18 has been shifted to bring the inner surface thereof substantially into tangential engagement or frictional contact with the outer face of the piston 17. When the parts of my brake are in the relative positions shown in this view, the liquid in the pocket approaching the point of tangency is substantially trapped and, in view of the incompressibility of liquid, it will be seen that the piston will then be locked or held against further rotation. In addition to the locking or holding effect provided by the trapped liquid, the frictional engagement of the cylinder on the face of the piston will also hold the latter from rotating and this frictional engagement will effectively maintain the brake in a set or locked condition, even though the trapped liquid may gradually seep out of the pocket. It will be noted also that when the cylinder has been shifted to its position of maximum eccentricity, that is to say, to its position corresponding with the locked condition of the brake shown in Fig. 4, the actuating cam 35 has assumed a position nearly in a straight line with a radial line of the piston 17. When in this position, the cam acts more or less as a toggle member so that little or no actuating force need be applied to the shaft 37 and lever 39 for maintaining the brake in its locked condition.

From the foregoing detailed description of my hydraulic brake, it will be seen that my invention contemplates a device of this character consisting of a relatively few number of parts which can be readily produced and easily assembled. It will be seen furthermore that the cylinder member of my hydraulic brake is supported and guided so that it will be in a free-running or floating condition and can either remain stationary or can rotate with the piston member and that this construction minimizes frictional drag and the generation of heat. It will also be seen that my hydraulic brake can be actuated or applied in varying amounts according to the braking effort required, or can be locked or set for preventing the vehicle wheels or other rotatable member from turning.

In Figs. 10 to 14, inclusive, I have shown a hydraulic clutch embodiment of my invention and as will be presently explained, this hydraulic clutch utilizes principles of operation and features of construction similar to those embodied in my hydraulic brake.

As here shown, my hydraulic clutch may comprise a rotatable outer or driving member 60, and a rotatable inner or driven member 61. The outer member may be in the form of a fluid tight housing having therein a combined operating and reservoir chamber 62 nearly filled with a body of oil or other appropriate liquid 62a. The inner or driven member 61 may be in the form of a piston member or piston carrying a plurality of radially movable vanes 63. A cylinder member or cylinder 65, preferably in the form of a ring, surrounds the piston so as to provide therebetween a working chamber 66 which is divided into a series of pockets 66a, 66b, 66c, and 66d by the vanes 63. The vanes are normally pressed outwardly against the inner face of the cylinder by the compression springs 67.

Figure 10:
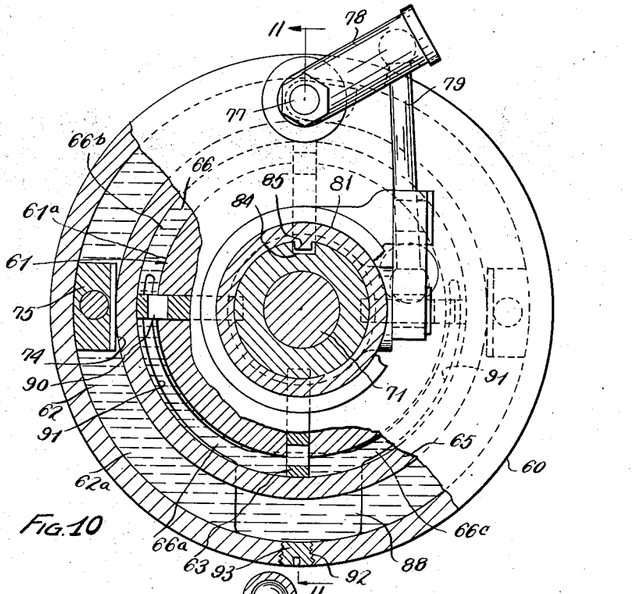
Fig. 10 is an end elevation, with parts in section, showing a hydraulic clutch constructed according to my invention and with the clutch in its released condition.
Figure 11:
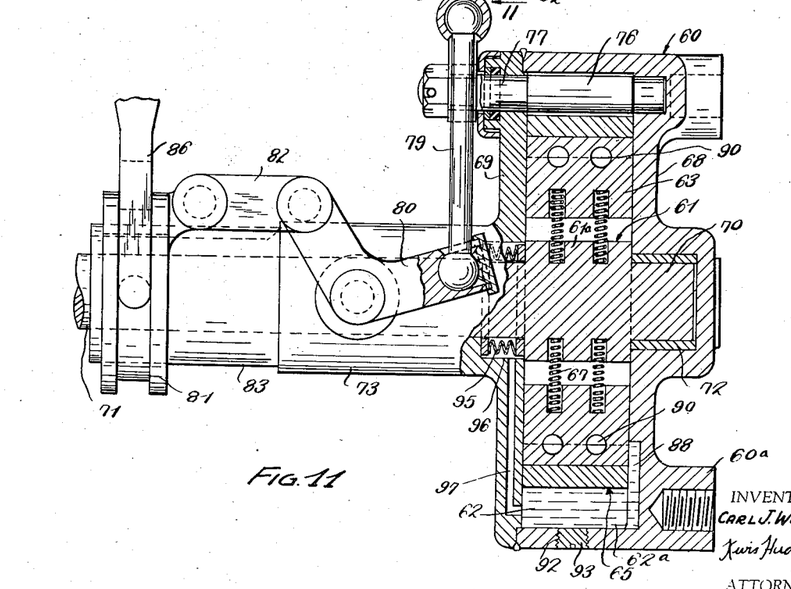
Fig. 11 is a longitudinal or axial sectional view taken through the clutch as indicated by line 11—11 of Fig. 10 and with certain portions of the device shown in elevation.

The driving member or housing 60 may comprise a drum-like member or section 68 containing the chamber 62 and a cover member or section 69 secured thereto by bolts or welding. The piston 61 may be mounted for rotation about a fixed axis in the housing 60 by means of shaft portions 70 and 71 which are journaled, respectively, in the bearing 72 of the housing section 68 and the aligned bearing sleeve 73 of the housing section 69. As shown in Fig. 10, the body 61a of the piston 61, the vanes 63 and the cylinder or ring 65, are all of substantially the same axial length as the chamber 62 and have substantially fluid tight working engagement with the inner faces of the housing sections 68 and 69.

My hydraulic clutch may be used for various purposes, for example, the driving member or housing 60 may be connected with a flywheel or other power-driven member as by means of screws extending into the tapped bosses 60a, and the driven member or shaft 71 may be connected with a gear train or other device to be operated. Although I refer hereinafter to the housing 60 as being the driving member and the shaft 71 as the driven member, this relation can obviously be reversed in which case the shaft will be the driving member and the housing the driven member.

Figures 12, 13, 14:
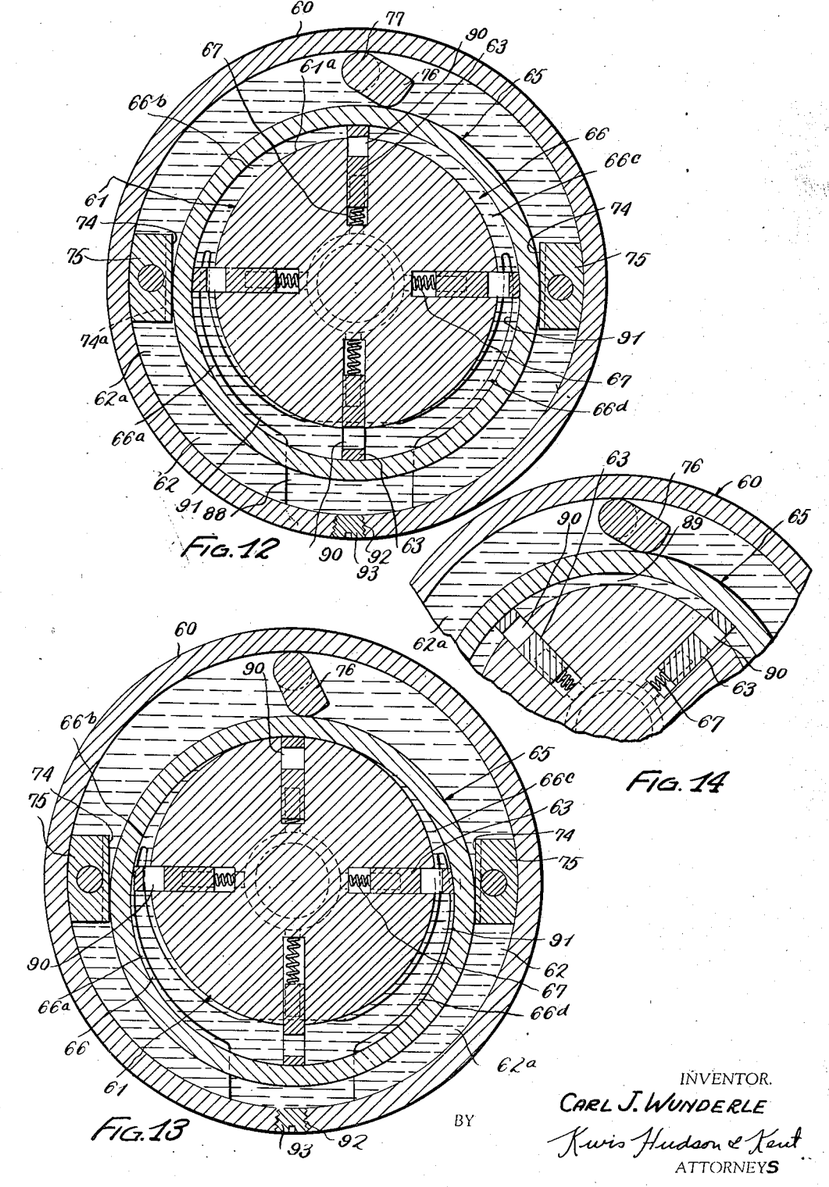
Fig. 12 is a transverse sectional view taken through the clutch and showing the relative positions of the parts thereof when the clutch is partially engaged.
Fig. 13 is a similar sectional view showing the clutch in its fully engaged or locked position.
Fig. 14 is a fragmentary sectional view similar to Fig. 12, but showing the piston member rotated 45° from its position in Fig. 12.

As in the case of my hydraulic brake described above, the cylinder 65 is supported and guided so as to more or less float in the housing 60 and to be rotatable with respect to both the housing member and the piston member. To this end the cylinder is supported by the vanes of the piston 61 and is guided in part by the end walls of the housing and by a pair of substantially diametrically opposed guide faces 74. The spring pressed vanes 63 normally hold the cylinder 65 in a position substantially concentric with the piston 61, as shown in Fig. 10, which corresponds with the released condition of the clutch. The cylinder is shiftable transversely of the axis of rotation of the piston to an accentric operating position, as shown in Fig. 12, or to an eccentric full-power or locked position, as shown in Fig. 13 and during such shifting, is guided by the bearing faces 74. These bearing faces may be provided on the housing by mounting or forming blocks 75 thereon so that the faces 74 thereof are in spaced substantially parallel relation and will be substantially tangent to the outer surface of the cylinder 65. Such shifting of the cylinder member to its eccentric operating and locked positions may be accomplished by a suitable actuating member or cam 76 forming a part of a clutch actuating linkage. If desired, the bearing faces 74 may have grooves 74a therein which permit the passage of the liquid 62a between these faces and the outer surface of the cylinder.

The cam 76 may be carried by a shaft 77 which may be journaled in the housing 60. Any suitable means may be provided for actuating the cam 76 and, in this instance, I show linkage for this purpose which may include a lever 78 carried on the outer end of the cam shaft 77 and connected, as by means of a link 79, with one arm of a bell crank lever 80 pivotally mounted on the bearing sleeve 73. The other arm of the bell crank lever 80 may be connected with a shiftable collar 81 by means of the link 82. The collar 81 may be slidable on a reduced portion 83 of the bearing sleeve 73 and may be splined or keyed for rotation therewith by means of the groove 84 and the tongue 85 engaging therein. Shifting of the collar 81 longitudinally of the sleeve portion 83, as by means of a shifter fork 86, will cause movement to be transmitted through the linkage to the cam shaft 77. The movement imparted to the cam shaft will cause rocking of the cam 76 to thereby shift the cylinder 65 either to an eccentric operating position or to its locked position, depending upon the extent of movement imparted to the cam.

For supplying liquid from the chamber 62 to the working chamber 66, I may provide the housing 60 with a supply port 88 which may be formed in one or both of the inner faces of the end walls of the housing at a point substantially diametrically opposite the cam 76. This port connects the working chamber 66 with the reservoir chamber 62 around the end or edge of the cylinder 65. When the cylinder is in its concentric position corresponding with the released condition of the clutch, (Fig. 10) the working chamber 66 is of circular or ring-like form and the pockets 66a, 66b, 66c and 66d remain substantially unchanged in volume during rotation of the driving member or housing 60 relative to the driven member or piston 61. In other words, when the cylinder is in its concentric position, the driving member or housing 60 may rotate freely around the cylinder and piston members and no power or motion will be transmitted through the clutch because at this time the liquid in the pockets 66a, 66b, 66c and 66d is not subjected to pressure and hence transmits no force.

When power is to be transmitted through the clutch and the cylinder 65 has been shifted for this purpose to its eccentric operating position shown in Fig. 12, the working chamber 66 is of more or less crescent shape and when the driving member or housing 60 is rotated about the piston 61, the cam 76 will travel around the piston and will bear against the cylinder 65 during such travel. As the cam 76 travels around the piston in contact with the cylinder, it will cause the point or section 89 of minimum space between the cylinder and piston members (see Fig. 14) to travel around the piston in the same direction and at the same speed of rotation as that at which the housing 60 is being rotated. The rotation of the housing 60 also causes the port 88 to travel past the pockets 66a, 66b, 66c and 66d in succession to supply liquid thereto from the chamber 62 whereby all of the pockets are maintained substantially full of liquid. The gyratory movement thus imparted to the cylinder 65 by the travel of the cam 76 therearound causes the pockets 66a, 66b, 66c and 66d to be successively reduced in volume and the liquid thereof subjected to pressure as they are traversed by the restriction 89. Thus by referring to Fig. 14 it will be seen that if the housing 60 is rotating clockwise the restriction is moving toward the vane 63a and the liquid in the portion of the pocket between the restriction and the vane 63a will be subjected to pressure. This causes pressure to be exerted against the vane 63a and results in rotation of the piston in the same direction as that in which the housing 60 is being rotated. A similar action occurs as the restriction 89 approaches each of the other vanes in succession.

To prevent the rotation of the piston 61 from being started with an undesirable suddenness when the cylinder 65 is shifted to an eccentric operating position, I may provide for a more or less regulated escape of liquid from the pockets. This may be accomplished by providing each of the vanes 63 with one or more passages or holes 90 therethrough adjacent their outer end. These holes or passages permit liquid to pass directly from one pocket to an adjacent pocket and thus prevent the building up of sudden or excessive pressure in any of the pockets. It will be noted, however, that as the eccentricity of the cylinder 65 is increased, these holes recede into the body of the piston 61 and hence become more or less covered and less effective as the full-power setting of the clutch is approached.

As another means of providing for a regulated flow of liquid out of the pockets, I may provide the port 88 with extension recesses 91. These recesses may be of tapered cross-section and of varying length and may extend arcuately around the portion of the housing 60 corresponding with the path of travel of the pockets 66a, 66b, 66c and 66d. The size and length of these extension recesses may be varied, as may be found desirable, in different forms of my clutch and for different kinds of service. It will also be understood that when the vanes are provided with the holes 90, these extension recesses may be omitted entirely.

In Fig. 13 I show the cylinder 65 shifted to an extreme or locked position in which its inner face is substantially intangential engagement or frictional contact with the outer face of the piston 61. In this condition of my clutch the driving member or housing 60 is locked or mechanically connected with the piston 61 and motion will then be transmitted from the driving member to the driven member with substantially no slippage therebetween. When the cylinder has been shifted to the position shown in Fig. 13, it will be seen that the cylinder and piston members are substantially in contact and there is no longer any restricted passage through which liquid can escape from the pocket being subjected to compression. This being the case, the liquid will be trapped in the pocket being subjected to compression and a locked condition between the cylinder and piston members will prevail by reason of the incompressibility of the trapped liquid. Should leakage of the trapped liquid take place, the locked condition between the cylinder and piston members will be maintained because of the frictional engagement between their adjacent surfaces.

The housing 60 of my hydraulic clutch may be provided with a suitable filling and drain opening 92 which may be closed by a screw plug 93.

Leakage of liquid out of the housing 60 through the bearing sleeve 73 may be prevented by providing a suitable packing for the shaft 71. In this instance I show a bellows-like yieldable packing 95 in a recess 96 of the housing section 69 and surrounding the shaft 71. A pressure relief and drain passage 97 may be provided to connect the recess 96 with the lower portion of the reservoir chamber 62.

From the foregoing detailed description of the construction and operation of my hydraulic clutch, it will be seen that the cylinder 65 is supported and guided so as to float in the housing 60 and so that it can rotate either with the housing or with the piston member. With the cylinder member supported and guided for operation in this manner, it will be seen that frictional drag between the members and heating of the liquid will be reduced to a minimum. It will also be seen that by merely shifting the cylinder member of my clutch, a desired power transmitting connection can be established between the driving and driven members depending upon the extent to which the cylinder member is shifted. It will be seen further that by shifting the cylinder member to an eccentric position in contact with the piston member, a desired locked condition can be established in which power can be transmitted from the driving member to the driven member substantially without slippage.

While I have illustrated and described the hydraulic brake and clutch devices of my invention in a somewhat detailed manner, it will be understood, of course, that I do not wish to be limited to the precise construction and manner of operation herein disclosed, but regard my invention as including such changes and modifications as to not constitute a departure from the spirit of the invention and the scope of the appended claims.

Having thus described my invention I claim:

1. In a hydraulic device of the character described, a pair of members relatively rotatable about a common axis and one within the other, one of said members having vanes movable to extend varying distances therefrom, the outer of said members providing a housing for the device and a reservoir having liquid therein, and a hollow cylinder member disposed between the members of said pair so as to define a working chamber in communication with said reservoir and cooperating with said vanes to form liquid receiving pockets in said chamber, said cylinder member consisting only of a ring formed by a circularly extending rim of substantially rectangular cross-section and being freely rotatable when in a position substantially concentric with said common axis and being shiftable transversely of said axis to an eccentric operating position for subjecting the liquid of said pockets to pressure.

2. In a hydraulic device of the character described, a pair of members relatively rotatable about a common axis and one within the other, one of said members having vanes movable to extend varying distances therefrom, the outer of said members providing a housing for the device and a reservoir having liquid therein, a hollow cylinder member disposed between the members of said pair so as to define a working chamber in communication with said reservoir and cooperating with said vanes to form liquid receiving pockets in said chamber, said cylinder member consisting only of a ring formed by a circularly extending rim of substantially rectangular cross-section and being freely rotatable when in a position substantially concentric with said common axis and being shiftable transversely of said axis to an eccentric operating position for subjecting the liquid of said pockets to pressure, and means for causing such transverse shifting of the cylinder member.

3. In a hydraulic device of the character described, a housing provided with axially spaced end walls and having liquid therein, a piston member mounted for rotation in said housing about a fixed axis and carrying vanes which are movable to extend varying distances therefrom, and a hollow cylinder member consisting of an open-ended plain ring surrounding said piston member and cooperating with said vanes to form pockets for the liquid, said cylinder member being free to rotate or to stand relatively stationary in said housing and being shiftable transversely of said axis from a concentric position in which the size of said pockets remains substantially unchanged during rotation of the piston member to an eccentric operating position in which the volume of said pockets is varied during rotation of the piston member for subjecting the liquid therein to pressure, said piston member, vanes and cylinder member all being of an axial length substantially equal to the spacing of said end walls and having the ends thereof in direct substantially fluid-tight sliding engagement with said end walls.

4. In a hydraulic device of the character described, a housing provided with axially spaced end walls and having liquid therein, a piston member rotatable in said housing about a fixed axis and carrying vanes which are movable to extend varying distances therefrom, a hollow cylinder member consisting of an open-ended plain ring surrounding said piston member and cooperating with said vanes to form pockets for the liquid, said cylinder member being free to rotate or to stand relatively stationary in said housing and being shiftable transversely of said axis from a concentric neutral or released position to an eccentric opertaing position in which the volume of said pockets is varied for subjecting the liquid therein to pressure, and means operable to cause such transverse shifting of the cylinder member, said piston member, vanes and cylinder member all being of an axial length substantially equal to the spacing of said end walls and having the ends thereof in direct substantially fluid-tight sliding engagement with said end walls.

5. In a hydraulic device of the character described, a housing having liquid therein, a piston member rotatable in said housing about a fixed axis and carrying vanes which are movable to extend varying distances therefrom, a hollow cylinder member consisting of a circular ring surrounding said piston member and cooperating with said vanes to form pockets for the liquid, said cylinder member being free to rotate or to stand relatively stationary in said housing and being shiftable transversely of said axis from a concentric neutral or released position to an eccentric operating position in which the volume of said pockets is varied for subjecting the liquid therein to pressure, means operable to cause such transverse shifting of the cylinder member, and means on the housing providing a pair of opposed substantially parallel plane thrust faces for guiding the cylinder member during the transverse shifting thereof, said cylinder member being in direct contact with said opposed thrust faces of the housing.

6. In a hydraulic device of the character described, a housing provided with axially spaced end walls and having liquid therein, a piston member rotatable in said housing about a fixed axis and carrying vanes which are movable to extend varying distances therefrom, a hollow cylinder member consisting of a ring surrounding said piston member and coopertaing with said vanes to form pockets for the liquid, said cylinder member being rotatable in said housing and shiftable transversely of said axis to an operating position in which the volume of said pockets is varied for subjecting the liquid therein to pressure during relative rotation of the piston member and housing, a pair of substantially diametrically spaced thrust elements in the housing providing opposed substantially parallel plane faces for guiding the transverse shifting of the cylinder member, and means engageable with the cylinder member substantially midway between said thrust elements and operable to cause said transverse shifting, said piston member, vanes and cylinder member all being of an axial length substantialy equal to the spacing of said end walls and having the ends thereof in direct substantially fluid-tight sliding engagement with said end walls.

7. In a hydraulic device of the character described, a housing having liquid therein, a piston member rotatable in said housing about a fixed axis and carrying vanes which are movable to extend varying distances therefrom, a hollow cylinder member surrounding said piston member and cooperating with said vanes to form pockets, said cylinder member being freely rotatable in the housing when in a position substantially concentric with said axis and being shiftable transversely of said axis to an eccentric operating position in which the volume of said pockets is varied for subjecting the liquid to pressure or to an eccentric locking position substantially in contact with the face of said piston member, and means for causing such shifting of the cylinder member including an actuating member engageable with the cylinder member and adapted to approach a radial position upon shifting of the cylinder member to its locking position.

8. In a hydraulic device of the character described, a housing having spaced end walls and providing an operating chamber and reservoir, liquid in said reservoir, a piston member rotatable in said chamber and carrying a set of spaced movable vanes, a cylinder member surrounding said piston member to provide therebetween a working chamber which is divided into pockets by said vanes, and a port in an end wall of the housing and submerged in the liquid for supplying liquid to said working chamber from said reservoir, said cylinder member being rotatable in the housing and shiftable to an eccentric operating position in which the liquid supplied to said pockets is subjected to pressure during relative rotation between the piston member and housing.

9. In a hydraulic brake, a housing providing an operating chamber and reservoir, liquid in said reservoir, a piston member rotatable in said chamber and carrying a set of spaced movable vanes, a cylinder member surrounding said piston member to provide therebetween a working chamber which is divided into liquid-receiving pockets by said vanes, said cylinder member being freely rotatable in said housing when in a position substantially concentric with said piston member in which the volume of said pockets remains substantially unchanged during rotation of the piston member and being shiftable to an operating position eccentric to the piston member in which the volume of said pockets changes during rotation of the piston member for subjecting liquid to pressure, and a port in the housing for supplying liquid to said pockets from said reservoir, said port being located to communicate with said working chamber only when said cylinder member has been shifted to an eccentric position.

10. In a hydraulic brake, a housing providing an operating chamber and reservoir, liquid in said reservoir, a piston member rotatable in said chamber and carrying a set of spaced movable vanes, a cylinder member surrounding said piston member to provide therebetween a working chamber which is divided into liquid-receiving pockets by said vanes, said cylinder member being rotatable in the housing and having a free-running position substantially concentric with the piston member in which the volume of said pockets is substantially unvaried and an eccentric operating position in which the volume of said pockets is varied during rotation of the piston member, a relief port in said housing located to connect the upper portion of said working chamber with the reservoir only while the cylinder member is substantially in its free-running concentric position, and a liquid supply port below the level of the liquid in the reservoir and located to connect the working chamber with the reservoir only when said cylinder member has been shifted to an eccentric position.

11. In a hydraulic brake of the character described, a housing having therein an operating chamber and reservoir, liquid in said reservoir, a piston member rotatable in said housing, a rotatable cylinder member surrounding the piston member to define a working chamber therebetween and having a free-running position substantially concentric with the piston member and being shiftable to a working position eccentric to the piston member, means operable to shift said cylinder member to its eccentric working position, spring pressed vanes carried by the piston member and cooperating with the cylinder member to divide the working chamber into pockets, said vanes being adapted to return the cylinder member to its free-running concentric position, a port in the housing and submerged in the liquid therein for supplying liquid from the reservoir to said pockets, and a relief port in said housing located to connect the upper portion of the working chamber with the reservoir only while the cylinder member is substantially in its free-running concentric position.

12. In a hydraulic device of the character described, a housing having liquid therein, a piston member rotatable in said housing about a fixed axis and carrying vanes which are movable to extend varying distances therefrom, a hollow cylinder member surrounding said piston member and cooperating with said vanes to form pockets for the liquid, said cylinder member being rotatable and shiftable transversely of said axis to an operating position in which the volume of said pockets is varied for subjecting the liquid therein to pressure, means for causing such transverse shifting of the cylinder member in the housing, and means for guiding the cylinder member during such shifting comprising a pair of opposed substantially parallel grooved faces in the housing and tangent to the outer surface of the cylinder member at substantially diametrically opposed points.

13. In a hydraulic brake of the character described, a housing having therein a combined reservoir and operating chamber, a piston member mounted for rotation in the housing about a fixed axis and carrying vanes movable to project varying distances therefrom, a cylinder ring surrounding the piston member to provide therebetween a working chamber which is divided into pockets by said vanes, means for supplying liquid from said reservoir chamber to the pockets of said working chamber, said cylinder ring being supported by said vanes and guided in the housing for rotation and shifting transversely of said axis from a free-running released position substantially concentric with the piston member to an operating position eccentric to the piston member, means engageable with a peripheral portion of the cylinder ring for causing such transverse shifting thereof, and means providing said housing with a normally open baffled vent connecting the upper portion of said reservoir with the atmosphere.

14. In a hydraulic clutch, a rotatable housing provided with axially spaced end walls and having a liquid-containing operating and reservoir chamber therein, a piston member mounted for rotation in the housing about a fixed axis and carrying a plurality of vanes movable to project varying distances therefrom, a cylinder member consisting of a plain ring surrounding the piston member and providing therebetween a working chamber which is divided into pockets by said vanes, means for supplying liquid to said pockets from said reservoir chamber, said cylinder member being supported by said vanes and guided in said housing for rotation either with the housing or with the piston member and for shifting transversely to said axis from a released position substantially concentric with the piston member to an operating position eccentric to said piston member, and actuating means operable to cause such transverse shifting of the cylinder member, said piston member, vanes and cylinder member being of an axial length substantially equal to the spacing of said end walls and having direct substantially fluid-tight sliding engagement with the latter.

15. In a hydraulic clutch, a rotatable housing having a liquid-containing operating and reservoir chamber therein, a piston member mounted for rotation in the housing about a fixed axis and carrying a plurality of vanes movable to project varying distances therefrom, a cylinder member surrounding the piston member and providing therebetween a working chamber which is divided into pockets by said vanes, means for supplying liquid to said pockets from said reservoir chamber comprising a port formed in the housing and submerged in the liquid therein, said cylinder member being supported by said vanes and guided in said housing for rotation either with the housing or with the piston member and for shifting transversely to said axis from a released position substantially concentric with the piston member to an operating position eccentric to said piston member, and actuating means disposed substantially opposite said port and operable to cause such transverse shifting of the cylinder member, said vanes being urged outwardly by spring pressure and adapted to return said cylinder member to its concentric position on release of said actuating means.

16. In a hydraulic device of the character described, a housing having therein a combined reservoir and operating chamber, a piston member mounted for rotation in the housing about a fixed axis and carrying vanes movable to project varying distances therefrom, a cylinder ring surrounding the piston member to provide therebetween a working chamber which is divided into pockets by said vanes, means for supplying liquid from said reservoir chamber to the pockets of said working chamber, said cylinder ring being supported by said vanes and shiftable transversely of said axis from a free-running released position substantially concentric with the piston member to an operating position eccentric to the piston member, means for guiding said cylinder ring during said transverse shifting comprising a pair of opposed substantially parallel plane thrust faces tangentially engaging the outer surface of the cylinder ring at substantially diametrically opposed points, and means for causing such transverse shifting of the cylinder ring comprising a swinging actuating member engageable with the outer surface of the cylinder ring and having its pivot axis lying in a plane disposed substantially midway between said plane thrust surfaces and extending substantially parallel thereto.

17. In a hydraulic device of the character described, a housing having spaced end walls and providing an operating chamber and reservoir, liquid in said reservoir, a piston member rotatable in said chamber and carrying a set of spaced movable vanes, a cylinder member surrounding said piston member to provide therebetween a working chamber which is divided into pockets by said vanes, a port in the housing and submerged in the liquid for supplying liquid to said working chamber from said reservoir, said cylinder member being rotatable in the housing and shiftable to an eccentric operating position in which the liquid supplied to said pockets is subjected to pressure during relative rotation between the piston member and housing, a shaft connected with said piston member and projecting from the housing, a leakage collecting chamber at least partially surrounding said shaft, and a return passage leading from said collecting chamber and communicating with said reservoir at a point adjacent said port.

18. In a hydraulic device of the character described, a housing providing a reservoir and having liquid therein, a rotatable piston member in said housing carrying a set of spaced movable vanes, a cylinder ring surrounding said piston member to provide therebetween a working chamber which is divided into pockets by said vanes, a port at a relatively low point of said housing for supplying liquid from the reservoir to said pockets, said cylinder ring being shiftable in said housing from an ineffective position substantially concentric with the piston member to an eccentric operating position in which the liquid supplied to said pockets is subjected to pressure during relative rotation between the piston member and housing, and a relief port at a relatively high point of said housing for connecting said working chamber with said reservoir for the relief of pressure from said pockets to said reservoir during operation of the device with said cylinder ring in its concentric ineffective position and during the initial eccentric shifting of said cylinder ring in the housing, said relief port being so arranged as to be closed after the initial eccentric shifting of said cylinder ring and to remain closed while said cylinder ring is in its eccentric operating position.

19. In a hydraulic device of the character described, a housing providing a reservoir and having liquid therein, a rotatable piston member in said housing carrying a set of spaced movable vanes, a cylinder ring surrounding said piston member to provide therebetween a working chamber which is divided into pockets by said vanes, a port at a relatively low point of said housing for supplying liquid from the reservoir to said pockets, said cylinder ring being shiftable transversely in said housing from an ineffective position substantially concentric with the piston member to an eccentric operating position in which the liquid supplied to said pockets is subjected to pressure during relative rotation in either direction between the piston member and housing, means operable to cause such transverse shifting of said cylinder ring, spaced substantially parallel guides on said housing for guiding such transverse shifting of said cylinder ring, and a relief port at a relatively high point of said housing for connecting said working chamber with said reservoir for the relief of pressure from said pockets to said reservoir during operation of the device in either direction with said cylinder ring in its concentric ineffective position and during the initial transverse shifting of said cylinder ring in the housing, said relief port being located on a diameter extending between and substantially parallel with said guides and being so arranged as to be closed after the initial eccentric shifting of said cylinder ring and to remain closed while said cylinder ring is in its eccentric operating position.

CARL J. WUNDERLE.